United States Patent [19]

Cox et al.

[11] 3,903,281
[45] Sept. 2, 1975

[54] QUINOXALINES AS FUNGICIDES AND BACTERICIDES

[75] Inventors: John Michael Cox; Roland Thomas Victor Fox, both of Wokingham; Raymond Alexander Burrell, Yateley, all of England

[73] Assignee: Imperial Chemical Industries Limited, London, England

[22] Filed: Nov. 29, 1973

[21] Appl. No.: 420,093

[30] Foreign Application Priority Data
Dec. 15, 1972  United Kingdom............... 57973/72

[52] U.S. Cl.................................. 424/250; 260/250
[51] Int. Cl.² ...................... A01N 9/00; A01N 9/22
[58] Field of Search...................... 260/250; 424/250

[56] References Cited
UNITED STATES PATENTS
3,186,905   6/1965   Hattori et al. ...................... 424/250

OTHER PUBLICATIONS
Chem. Abst. 48, 11427(b) (1954) "Quinoxaline N–Oxides."
Chem. Abst. 53, 16141(h) (1959) "Pyrazine Derivatives."
Chem. Abst. 53, 10241(i) (1958) "Prep. of 2,3 Dihydroxy – – – Acid."
Chem. Abst. 57, 10664(a) (1962) "Ultraviolet – – – Quinoxaline Deriv."
Chem. Abst. 74, 110756(m) (1971) "Fungicidal Activity."

*Primary Examiner*—Albert T. Meyers
*Assistant Examiner*—D. W. Robinson
*Attorney, Agent, or Firm*—Cushman, Darby & Cushman

[57] ABSTRACT

This invention relates to fungicidal and bactericidal compositions and to processes for combating fungi and bacteria with compounds of the formula:

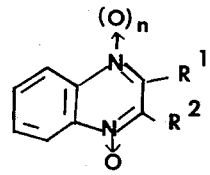

wherein $R^1$ is hydrogen, chlorine or bromine; $R^2$ is chlorine, bromine or iodine; and $n$ is 0 or 1.

7 Claims, No Drawings

QUINOXALINES AS FUNGICIDES AND BACTERICIDES

According to the present invention we provide a composition having anti-fungal and anti-bacterial properties comprising, as an active ingredient, a quinoxaline derivative having the formula:

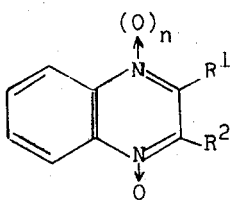

wherein $R^1$ is hydrogen or chlorine or bromine, $R^2$ is chlorine, bromine or iodine, and $n$ is 0 or 1, together with a carrier therefor.

The preferred carrier is a solid diluent, or a liquid diluent containing a surface active agent.

The invention further provides a process for combating fungi and bacteria, which comprises treating plants, seeds, harvested fruits or vegetables, infested with, or liable to infestation with, fungi or bacteria, with a composition as defined above.

The term "seeds" is intended to include propagative plant forms generally and therefore includes, for example, cut stems, corms, tubers, rhizomes and the like.

The invention further provides, as new compounds, a quinoxaline derivative having the structure:

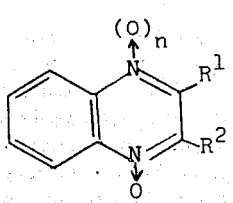

wherein $R^1$ is hydrogen, chlorine or bromine and $R^2$ is chlorine, bromine or iodine and $n$ is 0 or 1; provided that when $n$ is 0 and $R^1$ is hydrogen, $R^2$ is not chlorine.

The invention includes, for example, the following quinoxaline derivatives:

TABLE I

Compound No.   Structural Formula

1.

2.
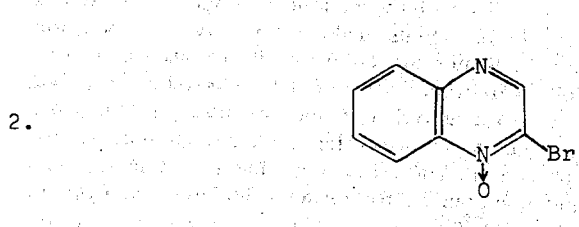

3.
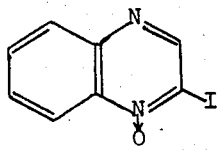

4.
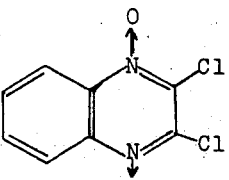

5.
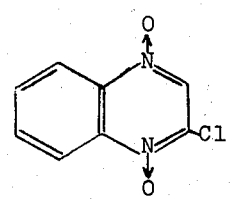

6.
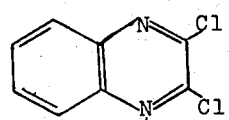

7.
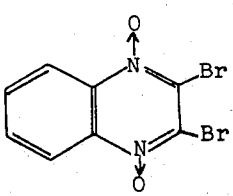

All the above compounds are new except for Compound No. 1. The invention therefore comprises, as new specific quinoxaline derivatives, the compounds numbered 2 to 7 in Table I above. As active ingredients in the invention compositions compounds Nos. 1 and 4 are preferred. As a new quinoxaline derivative compound No. 4 is preferred.

The compounds of this invention can be prepared, for example, by any of the general procedures set out below, and these may be used singly or in combination:

a. The oxidation of a halo- or di-halo-quinoxaline or an N-oxide thereof, or partial reduction of a di-N-oxide.

b. The reaction of a quinoxaline di-N-oxide derivative with an acidic halide, for example HBr or HCl (in the presence of light), $POCl_3$, $SOCl_2$, $PhSO_2Cl$, or $POBr_3$, to introduce halogen at the adjacent carbon atom with loss of the N-oxide function.

c. The diazotisation of an amino-substituted quinoxaline N-oxide derivative followed by replacement of the diazo group by halogen.

These methods are illustrated by specific examples hereinafter set forth.

The compounds, and compositions containing them, are variously active against foliar-borne fungal diseases, and against the following diseases also:

Seed and Soil-Borne Fungal Diseases

| | Examples of Host crop | |
|---|---|---|
| Pythium ultimum | Peas | Damping off |
| Phytophthora cactorum | Soybeans | Phytophthora Root Rot |
| Phytotophthora palmivora | Cocoa | Cocoa Black Pod |
| Fusarium culmorum | Wheat | Brown Foot Rot |
| Fusarium nivale | Rye | Foot Rot |
| Gibberella zeae | Maize | Foot Rot |
| Helminthosporium sativum | Barley | Foot Rot |
| Helminthosporium victoriae | Oats | Victoria Blight |
| Septoria nodorum | Wheat | Glume Blotch |
| Ascochyta pisi | Pea | Leaf and Pod Spot |
| Rhizoctonia solani | Cotton | Sore Shin |
| Sclerotium rolfsii | Peanuts | Southern blight |

Post-Harvest Fungal Diseases.

| Fungal Disease Organism | Examples of Host Crop(s) | Name |
|---|---|---|
| Botrytis tulipae | Bulbs | Fire |
| Nigrospora sphaerica | Bananas | Squirter |
| Phomopsis citri | Citrus | Stem End Rot |
| Alternaria citri | Citrus | Stem End Rot |
| Penicillium digitatum | Citrus | Green Mould |
| Gloeosporium musarum | Bananas | Anthra |
| Botryodiplodia theobromae | Bananas | Blackend |
| Fusarium caeruleum | Potato | Dryrot |
| Ceratocystis paradoxa | Sugarcane, pineapple | Pineapple Disease |
| Phoma exigua | Potato | Gangrene |
| Diplodia natalensis | Citrus | Stem End Rot |
| Phytophthora citrophthora | Citrus | Brown Rot |

Bacterial Diseases:

| Bacterial Disease Organism | Host Crop(s) | Name |
|---|---|---|
| Agrobacterium tumefaciens | Nursery plants, vegetables | crown gall |
| Corynebacterium michinganense | Tomato | canker |
| Xanthomonas malvacearum | Cotton | blackarm |
| Erwinia carotovora | Vegetables | soft rot |
| Xanthomonas oryzae | Rice | blight |
| Pseudomonas syringae | Beans, Stone fruit | dieback |
| Streptomycin scabies | Potato | scab |
| Pseudomonas mors-prunorum | Stone fruit | canker |
| Pseudomonas phaseolicola | Bean | haloblight |
| Erwinia amylovora | Apple, Pear | fireblight |

U.S. Pat. No. 3,453,365 discloses that the broad class of quinoxaline compounds having the structure:

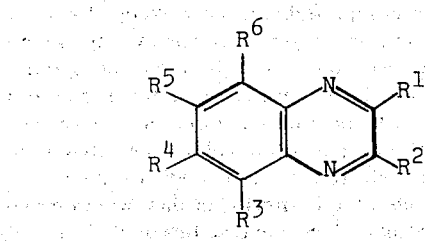

and N-oxides thereof, wherein $R^1$ to $R^6$ are inter alia, hydrogen or halogen (a wide range of substituents being recited) are useful fungicides. The preferred (and claimed) compounds, however, all bear from 3 to 4 halogen atoms as substituents on the benzene ring portion of the molecule; that is to say at least three of $R^3$ to $R^6$ are halogen, especially chlorine, atoms.

There are no examples of compounds wherein $R^3$ to $R^6$ are all hydrogen and we have now found, as will be evidenced hereinafter, that compounds of this narrow type which are N-oxides and wherein $R^1$ and $R^2$ have the values recited earlier are surprisingly and remarkably more effective fungicides having, in addition, the further utility of combating bacterial diseases of plants and post-harvest fungi. More particularly the compositions and compounds of the present invention are also soil fungicides, whereas the earlier compounds are foliar fungicides. This change in breadth of activity is surprising and remarkable.

The compositions of the invention may be in the form of dusting powders or granules wherein the active ingredient is mixed with a solid diluent or carrier.

Suitable diluents or carriers may be, for example, kaolin, bentonite, kieselguhr, dolomite, calcium carbonate, talc, powdered magnesia, Fuller's earth, gypsum, Hewitt's earth, diatomaceous earth and China clay. Compositions for dressing seed, for example, may comprise an agent assisting the adhesion of the composition to the seed, for example a mineral oil.

The compositions may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally solutions, aqueous dispersions or emulsions containing the active ingredient in the presence of one or more wetting agents, dispersing agents, emulsifying agents or suspending agents.

Wetting agents, dispersing agents and emulsifying agents may be of the cationic, anionic or non-ionic type. Suitable agents of the cationic type include, for example, quaternary ammonium compounds, for example, cetyltrimethyl ammonium bromide. Suitable agents of the anionic type include, for example soaps, salts of aliphatic monoesters of sulphuric acid, for example sodium lauryl sulphate, salts of sulphonated aromatic compounds, for example sodium dodecylbenzenesulphonate, sodium, calcium or ammonium lignosulphonate, butyl-naphthalene sulphonate, and a mixture of the sodium salts of diisopropyl- and triisopropyl-naphthalene sulphonic acids. Suitable agents of the non-ionic type include, for example, the condensation products of ethylene oxide with fatty alcohols such as oleyl alcohol or cetyl alcohol, or with alkyl phenols such as octylphenol, nonylphenol and octylcresol.

Other non-ionic agents are the partial esters derived from long chain fatty acids and hexitol anhydrides, the condensation products of the said partial esters with ethylene oxide, and the lecithins. Suitable suspending agents are, for example, hydrophilic colloids, for example polyvinylpyrrolidone and sodium carboxymethylcellulose, and the vegetable gums, for example gum acacia and gum tragacanth.

The aqueous solutions, dispersions or emulsions may be prepared by dissolving the active ingredient in an organic solvent which may contain one or more wetting, dispersing or emulsifying agents, and then adding the mixture so obtained to water which may likewise contain one or more wetting, dispersing or emulifying agents. Suitable organic solvents are ethylene dichloride, isopropyl alcohol, propylene glycol, diacetone alcohol, toluene, methylnapthalene, xylenes anad trichlorethylene.

By the term "wetting agent" in this specification is intended substances having surface active properties.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example for improving the distribution, adhesive power and resistance to rain on treated surfaces, the different compositions can be better adapted for the various uses for which they are intended.

The compound may also be conveniently formulated by admixing it with fertilizers. A preferred composition of this type comprises granules of fertilizer material incorporating an invention compound. The fertilizer material may, for example, comprise nitrogen, or phosphate-containing substances.

The compositions which are to be used in the form of aqueous dispersions or emulsions are generally supplied in the form of a concentrate containing a high proportion of the active ingredient, the said concentrate to be diluted with water before use.

The concentrates are often required to withstand storage for prolonged periods and after such storage, to be capable of dilution with water in order to form aqueous preparations which remain homogeneous for a sufficient time to enable them to be applied by conventional spray equipment.

The concentrates may conveniently contain from 10–85% and generally from 25–60% by weight of the active ingredient. When diluted to form aqueous preparations, such preparations may contain varying amounts of the active ingredient depending upon the purpose for which they are to be used, but an aqueous preparation containing between 0.01% and 10% by weight of active ingredient may be used.

It is to be understood that the fungicidal compositions of this invention may comprise one or more other compounds having biological activity. Thus, to broaden the spectrum of fungicidal activity the invention compositions may comprise a fungicidal substance in addition to the active quinoxaline derivative. Thus the compounds having the British Standard common names metazoxolon, drazoxolon, thiram, maneb and captan.

The invention is illustrated by the following Examples, in which temperatures expressed in degrees are unless otherwise stated, in degrees centigrade. Thus by 55°, for example, is intended 55°C.

EXAMPLE 1

This example illustrates the preparation of 2-chloroquinoxaline 1-oxide, having the structural formula:

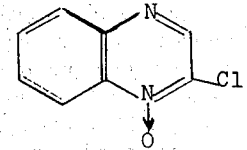

Thionyl chloride (174g.) was added dropwise over 70 minutes to a gently refluxing mixture of quinoxaline 1,4-dioxide (170g.), dimethylformamide (4.25 ml.) and dichloromethane (1700 ml.). Heating was continued for a further 20 hours, water (1 ml.) added and the mixture cooled in an ice-bath for 2 hours. The solid was filtered off, sucked dry and stirred vigorously with water (31.) for one hour. The solid produced was filtered and dried to give the title compound (145 g., m.p 111°–112°).

The compound of this example can also be prepared by treating o-phenylene diamine with glyoxal, oxidising the product with subsequent removal of water if necessary, and treating the quinoxaline 1,4-dioxide, so obtained, in situ with thionyl chloride as described above

EXAMPLE 2

This example illustrates the preparation of 2-chloroquinoxaline 1-oxide by an alternative procedure to that described in Example 1. Quinoxaline 1,4-dioxide (40 g.) was added portionwise to benzene sulphonyl chloride (200 ml., preheated to 55°) at such a rate that the temperature remained between 55° and 60°. The mixture was allowed to cool slowly to room temperature and the resultant solid filtered off and washed well with acetone. A suspension of this material in water (150 ml.) was treated firstly with a solution of potassium bicarbonate (40 g.) in water (200 ml.), then acetone (400 ml.) and pyridine (1 ml.). The mixture was stirred until dissolution was complete then the acetone was removed in vacuo. 2-Chloroquinoxaline 1-oxide (23.7 g.) was filtered, dried and recrystallized from isopropanol to give material m.p. 112°–115°.

EXAMPLE 3

This example illustrates the preparation of 2-chloroquinoxaline 1-oxide by an alternative procedure to those described in Examples 1 and 2. A solution of sodium nitrite (150 mg.) in water (2 ml.) was added dropwise at 0°–5° to a vigorously stirred mixture of 2-aminoquinoxaline 1-oxide (320 mg.), sodium chloride (1.0 g.) concentrated hydrochloric acid (5 ml.), water (5 ml.) and dichloromethane (20 ml.). After 30 minutes the organic layer was washed with water, dried and evaporated to give crude 2-chloroquinoxaline 1-oxide (260 mg.). Recrystallization from isopropanol gave material m.p. 113°–115°.

The compound was similarly prepared using sulphuric acid in place of hydrochloric acid.

EXAMPLE 4

This example illustrates the preparation of 2-chloroquinoxaline 1-oxide by an alternative procedure to those described in Examples 1, 2 and 3. A solution of sodium nitrite (2.8 g.) in water (6 ml.) was added dropwise at −5° to a solution of 2-aminoquinoxaline 1-oxide (can be prepared as described in Chemical Abstracts (C.A.) Vol. 59 12807 e and Vol. 68 114549u) (6.44 g.) in 40% fluoboric acid (30 ml.). The yellow precipitate was immediately filtered, washed with cold tetrahydrofuran, then cold ether and dried to give quinoxaline 1-oxide 2-diazonium tetrafluoroborate (8.6 g.). The diazonium salt (255 mg.) was added at 0° to a stirred mixture of concentrated hydrochloric acid (1 ml.) and dichloromethane (5 ml.). After thirty minutes, the organic layer was washed, dried and evaporated to give 2-chloroquinoxaline 1-oxide (175 mg.). Recrystallization from isopropanol gave material m.p. 112°–114°.

EXAMPLE 5

This example illustrates the preparation of 2-chloroquinoxaline 1-oxide by an alternative procedure to those described in Examples 1–4. A solution of quinoxaline 1,4-dioxide (4.0g.) in 0.5 N hydrochloric acid (400 ml.) was irradiated either with a uv lamp or with sunlight until all the starting material had been consumed. Extraction with dichloromethane gave a mixture from which the title compound (1.5 g., m.p. 112°–114°) was extracted by chromatography.

EXAMPLE 6

This example illustrates the preparation of 2-bromoquinoxaline 1-oxide, having the structural formula:

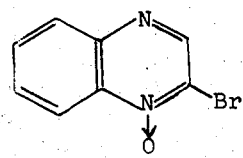

Quinoxaline 1-oxide 2-diazonium tetrafluoroborate (8.6 g., prepared as described in Example 4) was added portionwise at 5° to a mixture of concentrated hydrobromic acid (39 ml.), water (100 ml.) and dichloromethane (200 ml.). The mixture was stirred for 30 minutes and the organic layer washed, dried and evaporated to give the title compound (5.8 g., m.p. 96°–98°). Recrystallization from cyclohexane gave material m.p. 100°.

EXAMPLE 7

This example illustrates the preparation of 2-bromoquinoxaline 1-oxide by an alternative procedure to that described in Example 6. A solution of quioxaline 1,4-dioxide (4.0g.) in 0.5N hydrobromic acid (500 ml.) was allowed to stand in sunlight for 2 weeks. Extraction with dichloromethane gave a mixture from which 2-bromoquinoxaline 1-oxide (1.2g., m.p. 101°–2°) was recovered by chromatography.

EXAMPLE 8

This example illustrates the preparation of 2-iodoquinoxaline 1-oxide having the structural formula:

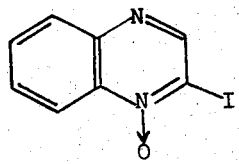

Quinoxaline 1-oxide 2-diazonium tetrafluoroborate (1.2g., prepared as described in Example 4) was added portionwise at 5° to a vigorously stirred mixture of sodium iodide (0.6 g.), water (10 ml.) and dichloromethane (40 ml.). After 1 hour, the organic layer was cooled, dried and evaporated to give a white solid (1.04 g.). The title compound (0.6 g., m.p. 145°–7°) was isolated by chromatography and recrystallization from cyclohexane.

EXAMPLE 9

This example illustrates the preparation of 2,3-dichloroquinoxaline 1,4-dioxide having the structural formula:

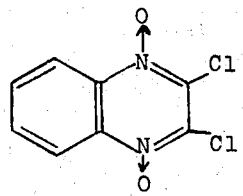

A solution of 2,3-dichloroquinoxaline (20.0 g.) in trifluoroacetic acid (100 ml.), was cooled in ice and treated with hydrogen peroxide (90%, 11 ml.). The mixture was stirred at 10° for 1 hour, than at 20° for a further 20 hours. Water (450 ml.) and chloroform (600 ml.) were added, the mixture filtered and the organic layer washed and dried. Evaporation and recrystallization from acetonitrile gave the title compound (7.57g.), m.p. 226°–227°.

EXAMPLE 10

This example illustrates the preparation of 2-chloroquinoxaline 1,4-dioxide having the structural formula:

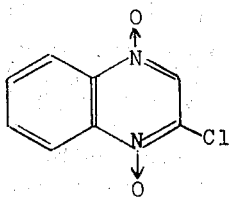

Hydrogen peroxide (85%, 20 ml.) was added at 5° to a solution of 2-chloroquinoxaline 1-oxide (20.0 g.) in trifluoroacetic acid (200 ml.). The mixture was allowed to stand overnight at room temperature, diluted with water (200 ml.) and extracted with chloroform. The extracts were washed, dried and evaporated to give a solid (14.7 g.). Recrystallization from isopropanol gave the title compound (10.6 g., m.p. 191°–2°).

A solution of 85% hydrogen peroxide in concentrated sulphuric acid can be used in place of trifluoroacetic acid but the yield may be reduced.

EXAMPLE 11

This example illustrates the preparation of 2-chloroquinoxaline 1,4-dioxide by an alternative procedure to that described in Example 10. A solution of sodium nitrite (0.2g.) in water (1 ml.) was added dropwise below 5° to a stirred mixture of 2-aminoquinoxaline 1,4-dioxide (0.44 g.), sodium chloride (0.5 g.), concentrated hydrochloric acid (3 ml.) and water (5 ml.). After one hour the mixture was extracted with chloroform to give a solid (100 m.g.). The residue after four extractions of this material with boiling cyclohexane was shown to be the title compound (40 mg., m.p. 189°–190°).

EXAMPLE 12

This example illustrates the preparation of 2,3-dichloroquinoxaline 1-oxide having the structural formula:

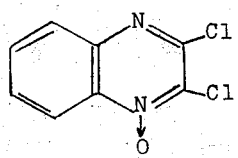

A mixture of 2-chloroquinoxaline 1,4-dioxide (3.0 g, prepared as described in Example 10) and phosphorus oxychloride (20 ml.) was heated at 80° for 3 minutes. The exothermic reaction was allowed to subside and heating continued for a further two minutes. The mixture was allowed to cool somewhat, then poured in a thin stream into well-stirred ice-water. The precipitate was dried and recrystallized from methanol to give the title compound (1.60 g.), m.p. 138°–139°.

EXAMPLE 13

This example illustrates the preparation of 2,3 dibromoquinoxaline 1,4-dioxide having the structural formula:

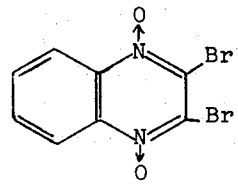

A suspension of 2,3 dibromoquinoxaline (2.8 g.) in trifluoroacetic acid (10 ml.), was cooled in ice and treated with hydrogen peroxide (90%, 1.1 ml.). The mixture was stirred in the ice bath for 1 hour and in a waterbath for 16 hours. Water (45 ml.) was added, the mixture was filtered and the solid was shaken with a large volume of chloroform and a little water. The mixture was filtered, the cake was washed well with chloroform and water and the two layers were separated.

The chloroform layer was washed and dried, evaporated and recrystallized from acetonitrile to give the title compound 0.73 g. m.p. 189° (decomp).

EXAMPLE 14

This example illustrates an atomisable fluid comprising a mixture consisting of 25% by weight of Compound No. 1 of Table I and 75% by weight of xylene.

EXAMPLE 15

This example illustrates a dusting powder which may be applied directly to plants or other surfaces and comprises 1% by weight of Compound No. 4 of Table I and 99% by weight of talc.

EXAMPLE 16

25 Parts by weight of the product described in Example I, 65 parts by weight of xylene, and 10 parts of an alkyl aryl polyether alcohol ('Triton' X-100; 'Triton' is a Trade Mark) were mixed in a suitable mixer. There was thus obtained an emulsion concentrate which can be mixed with water to produce an emulsion suitable for use in agriculture application.

EXAMPLE 17

5 Parts by weight of Compound No. 4 of Table I were thoroughly mixed in a suitable mixer with 95 parts by weight of talc. There was thus obtained a dusting powder.

EXAMPLE 18

This example illustrates a concentrated liquid formulation in the form of an emulsion. The ingredients listed below ere mixed together in the stated proportions and the whole stirred until the constituents were dispersed.

| | % wt. |
|---|---|
| Compound No. 1 (Table I) | 20 |
| "Lubrol" L ("Lubrol" is a Trade Mark) | 17 |
| Calcium dodecylbenzenesulphonate | 3 |
| Ethylene dichloride | 45 |
| "Aromasol" H ("Aromasol" is a Trade Mark) | 15 |
| | 100% |

EXAMPLE 19

The ingredients listed below were ground together in the proportions stated to produce a powdered mixture readily dispersible in liquid.

| | % wt. |
|---|---|
| Compound No. 4 (Table I) | 50 |
| Dispersol T ("Dispersol" is a Trade Mark) | 5 |
| China Clay | 45 |
| | 100% |

EXAMPLE 20

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44 – 100 to obtain the desired size of grains.

| | % wt. |
|---|---|
| Compound No. 4 (Table I) | 50 |
| Dispersol T | 12.5 |
| Calcium lignosulphonate | 5 |
| Sodium dodecylbenzenesulphonate | 12.5 |
| Sodium acetate | 20 |
| | 100 |

EXAMPLE 21

A composition suitable for use as a seed dressing was prepared by mixing all three of the ingredients set out below in the proportions stated.

| | % wt. |
|---|---|
| Compound No. 4 (Table I) | 80 |
| Mineral Oil | 2 |
| China Clay | 18 |
| | 100% |

EXAMPLE 22

A granular composition was prepared by dissolving the active ingredient in a solvent, spraying the solution obtained onto the granules of pumice and allowing the solvent to evaporate.

| | % wt. |
|---|---|
| Compound No. 4 (Table I) | 5 |
| Pumice Granules | 95 |
| | 100% |

EXAMPLE 23

An aqueous dispersion formulation was prepared by mixing and grinding the ingredients recited below in the proportions stated.

| | % wt. |
|---|---|
| Compound No. 4 (Table I) | 40 |
| Calcium lignosulphonate | 10 |
| Water | 50 |
| | 100% |

The following constitutes an explanation of the compositions or substances represented by the various Trade Marks and Trade Names referred to in the foregoing Examples.

"LUBROL" L is a condensate of 1 mole of nonyl phenol with 13 molar proportions of ethylene oxide.

"AROMASOL" H is a solvent mixture of alkylbenzenes

"DISPERSOL" T is a mixture of sodium sulphate and a condensate of formaldehyde with the sodium salt of naphthalene sulphonic acid.

"LISSAPOL" NX is a condensate of 1 mole of nonyl phenol with 8 moles of ethylene oxide.

"TRITON" X-100 is an alkyl aryl polyether alcohol.

EXAMPLE 24

The compounds of this invention were tested against a variety of foliar fungal diseases of plants. The technique employed is to spray the foliage of the undiseased plants with a solution of the test compound and also to drench the soil in which the plants are growing with another solution of the same test compound. All solutions for spraying contained 0.01% of the test compound. All the soil drench solutions also contained 0.01% of the test compound. The plants were then infected with the disease it was desired to control and after a period of days, depending upon the particular disease, the extent of the disease was visually assessed. The results are given in Table III below, wherein the extent of the disease is given in the form of a grading as follows:

| Grading | Percentage Amount of Disease |
|---|---|
| 0 | 61 to 100 |
| 1 | 26 to 60 |
| 2 | 6 to 25 |
| 3 | 0 to 5 |

In Table II, the disease is given in the first column, and in the second column is given the time which elapsed between infecting the plants and assessing the amount of disease.

TABLE II

| Disease and Plant | Time interval (days) | Disease code letter (Table IV) |
|---|---|---|
| Phytophthora infestans | 4 | A |

TABLE II-Continued

| Disease and Plant | Time interval (days) | Disease code letter (Table IV) |
|---|---|---|
| (tomato) Plasmopara viticola (vine) | 7 | B |
| Botrytis cinerea (tomato) | 3 | C |

TABLE III

| Compound No of Table I | Disease Code Letter | | |
|---|---|---|---|
| | A | B | C |
| 1 | 2 | 0 | 1 |
| 2 | 3 | 3 | 1 |
| 3 | 3 | 3 | 1 |
| 4 | 2 | 3 | 3 |
| 5 | 3 | 0 | 0 |

EXAMPLE 25

Compositions according to the invention were made up and tested against various soil-borne fungal diseases, and the procedure used in these tests, and the results obtained in each of them, are shown hereinafter. The compounds tested were those numbered 1 to 6 of Table I above and the compound 5, 6, 7, 8 tetrachloroquinoxaline was similarly tested. This compound is the active constituent of the product having the Trade Name "Lucel" and has the British Standard common name of chloroquinox.

Test against *Pythium ultimum* - Procedure.

Approximately 1 gram portions of culture of *Pythium ultimum* maintained on 2% malt agar test tube slopes at 20°C are transferred to about 400 grams of sterilized soil containing 5% maize meal in a half pint bottle. After 10 to 14 days the inoculated soil is mixed with sterile John Innes seed compost at a rate of 2 bottles to 3½ buckets of 2 gallons capacity.

The mixture is moistened and covered and after three days is used as follows. Approximately 100 grams of the mixture is placed into a fibre pot and 10 pea seeds coated 2 days beforehand with chemical under test at the rate of 1000 ppm. are sprinkled on the surface of the soil. Another 100 grams of the mixed soil is then placed on top of the seeds and the pot is kept in the greenhouse at between 16°C and 22°C. A first count of emergent seedlings is made after 10 days and another week is allowed to lapse before a second visual assessment takes place by pulling the seedlings up and inspecting their roots. Six replicates are conducted and observations are made of the number of healthy seedlings and the number of unhealthy seedlings. The number of ungerminated seeds is 10 less the number of emergent seedlings. Controls wherein untreated seed is used, and also standards wherein seed treated with thiram are used, are simultaneously carried out. Calculations are then made whereby a grading is obtained for disease control.

Test against *Fusarium culmorum* - Procedure

In the test John Innes seedling compost is admixed with a culture of *Fusarium culmorum* grown on an admixture of soil and cornmeal and the entire mixture then enclosed in a suitable container and incubated in the glasshouse for 48 hours.

The incubated soil is placed in pots; then wheat seeds (20 per pot) treated with china clay compositions containing the invention compound in concentration of 1000 parts per million are sown in the pots. Seeds treated with AGROSAN (Trade Mark) mercury seed dressing are used as a standard. Counts of the seedlings emergent 10 days after sowing are taken and the results converted to a percentage of the seeds sown. Disease assessments are made 16 days after sowing.

Test against *Rhizoctonia solani* - Procedure.

In the test an inoculum of *Rhizoctonia solani* is added to a partially sterilized loam soil, to provide the latter with a 1% w/w content of the inoculum. The loam soil is then allowed to stand for one week so as to be completely colonised by the fungus. The compound is then admixed with the loam soil at a rate of 100 parts per million by weight of soil. After standing for four days to allow the chemical to take effect plastic pots are half-filled with untreated, partially sterilized, loam soil and cotton seeds sown on the surface thereof, whereafter the pots are topped up with the chemically treated, infected loam soil. A control experiment is conducted with P C N B (pentachloronitrobenzene). The pots are then inspected and assessed 14 days later for disease.

The results of the three foregoing tests are expressed as follows:

| Grading | Significance of Grading |
|---|---|
| 0 | No activity or up to 20% of the disease control given by standard. |
| 1 | 20–75% of the disease control given by standard |
| 2 | 75–99% of the disease control given by standard |
| 3 | Degree of control equal to, or better than, standard. |

TABLE IV

| Disease | Grading Compound No. (Table I) | | | | | | Chlorquinox |
|---|---|---|---|---|---|---|---|
| | 1 | 2 | 3 | 4 | 5 | 6 | ('LUCEL') |
| Pythium ultimum (1000 ppm.) | 2 | 3 | — | 3 | — | 3 | 0 |
| Fusarium culmorum (1000 ppm). | 3 | 3 | 0 | 2 | 3 | 2 | 0 |
| Rhizoctonia solani (50 ppm). | 3 | 2 | 3 | 2 | 3 | 2 | 0 |

"—" means not tested

LUCEL is a registered Trade Mark. It comprises, as active ingredient, 5,6,7,8-tetrachloroquinoxaline (B.S. common name Chlorquinox).

EXAMPLE 26

The activity of compounds Nos. 1 to 6 of Table I against a wide variety of plant bacterial diseases and fungal post-harvest saprophytic diseases was investigated by invitro tests as follows. 5 mg. of the compound under test was dissolved or suspended in 10 cc of 10% aqueous acetone and 2 cc. of this solution or suspension was added to 18 cc. of nutrient agar (for the bacterial diseases) or 16 cc of 2% malt agar (for the fungal diseases) to give a final concentration of 50 parts per million of the compound under test. 2 cc. of a streptomycin preparation containing 100 units/cc. was added to the malt agar to prevent bacterial contamination of the fungal tests.

The agar preparations were dried overnight in petri dishes and inoculated the following morning with the bacterial or fungal diseases using a multipoint inoculator. The antibacterial activity was assessed after 5 days and the antifungal activity after 6 days.

The tests were conducted alongside similar tests using 5,6,7,8-tetrachloroquinoxaline (chloroquinox) as the active compound.

The results of the tests are set out below in Table VI (antibacterial activity) and Table VII (antifungal activity). The results are graded as set out below. The names of the disease organisms are indicated in Table V.

0 = No control
1 = Slight Control
2 = Fair Control
3 = Complete Control

TABLE V

| Bacterial Disease Organism | Code Table 3 | Fungal Disease | Code Table 4 |
|---|---|---|---|
| Agrobacterium tumifaciens | B1 | Nigrospora sphaerica | F1 |
| Corynebacterium michiganense | B2 | Phytophthora citrophthora | F2 |
| Erwinia carotovora | B3 | Alternaria citri | F3 |
| Xanthomonas oryzae | B4 | Diplodia natalensis | F4 |
| Streptomyces scabies | B5 | Phompsis citri | F5 |
|  |  | Ceratocystis paradoxa | F6 |
|  |  | Gloeosporium musarum | F7 |
|  |  | Penicillium digitatum | F8 |
|  |  | Phoma exigua | F9 |
|  |  | Botrytis tulipae | F10 |
|  |  | Botryodiplodia theobromae | F11 |
|  |  | Fusarium caeruleum | F12 |

TABLE VI

| Compound | Disease Code (Table 2) | | | | |
|---|---|---|---|---|---|
|  | B1 | B2 | B3 | B4 | B5 |
| 5,6,7,8 tetrachloroquinoxaline | 0 | 0 | 0 | 0 | 0 |
| Compound No. 1 | 3 | 2 | 2 | 2 | 2 |
| Compound No. 2 | 2 | 0 | 0 | 1 | 2 |
| Compound No. 3 | 3 | 0 | 0 | 1 | 1 |
| Compound No. 4 | 3 | 3 | 3 | 3 | 3 |
| Compound No. 5 | 3 | 3 | 0 | 3 | 3 |
| Compound No. 6 | 2 | 2 | 3 | 0 | — |

"—" means no test was carried out

TABLE VII

| Compound | Disease Code (Table 2) | | | | | | | | | | | |
|---|---|---|---|---|---|---|---|---|---|---|---|---|
|  | F1 | F2 | F3 | F4 | F5 | F6 | F7 | F8 | F9 | F10 | F11 | F12 |
| 5,6,7,8 tetrachloroquinoxaline | 0 | 0 | 0 | 0 | 0 | 0 | 0 | 0 | 0 | 0 | 0 | 0 |
| Compound No. 1 | 3 | 3 | 3 | 3 | 3 | 3 | 3 | 3 | 3 | 3 | 3 | 3 |
| Compound No. 2 | 3 | 3 | 3 | 3 | 3 | 3 | 3 | 3 | 3 | 3 | 3 | 3 |
| Compound No. 4 | 3 | 3 | 3 | 3 | 3 | 3 | 3 | 3 | 3 | 3 | 3 | 3 |
| Compound No. 5 | 3 | 3 | 3 | 3 | 3 | 3 | 3 | 3 | 3 | 3 | 3 | 3 |
| Compound No. 6 | 3 | 3 | 3 | 3 | 3 | 3 | 3 | 3 | 3 | 3 | 3 | 3 |

The above results demonstrate with great clarity the surprisingly useful bactericidal activity of fungicidal compositions according to the present invention in comparison with the complete inactivity of the compound 5,6,7,8-tetrachloroquinoxaline (B.S. common name Chlorquinox).

A number of in vivo tests were carried out against various other bacterial diseases of plants and the details of how these tests were conducted, and the results obtained, are set out in the Examples below.

EXAMPLE 27

Dwarf French Bean seeds were infected with *Pseudomonas phaseolicola* (haloblight of beans) by soaking for 6 hours in an 18 hour old nutrient broth shake culture of *Pseudomonas phaseolicola*. The seeds were then air-dried to constant weight of 25°C. The seeds were then dressed with a seed dressing containing 100 parts per million of Compound No. 1 of Table I. The seeds were then planted in sterile compost. After 2 weeks the condition of the emerged seedlings was assessed and they were found to be completely free from infection.

An identical test using as active ingredient the compound tetrachloroquinoxaline (LUCEL) gave only a very slight control of the disease at a rate of 1000 parts per million.

EXAMPLE 28

This example illustrates the use of the invention compound to control the disease *Xanthomonas malvacearum* (black arm) on cotton. Cotton seeds were soaked for 24 hours in a $10^{10}$ cells per millilitre suspension of 18 hour old bacteria and then dried. The seeds were then dressed with a formulation containing the Compound No. 1 of Table I dispersed in Kaolin containing 2% mineral oil. The concentration of the active compound was 12% by weight and the seed dressing was applied at the rate of 1000 parts of active compound per million parts of seeds. Five seeds were then planted per pot in 2 inch diameter pots, replicated four times. Emergence of the seedlings and disease control was assessed fourteen days later after keeping the plants in a relative humidity of 100%. It was found that substantial control of the disease was obtained representing a grading of 2 on a grading scale of from 0 to 3 where 0 represents non-germinated seeds and wholly infected seedlings and 3 represents germinated seeds and disease-free seedlings. When repeated with tetrachloroquinoxaline a grading of 0 was obtained in this test.

EXAMPLE 29

This example illustrates the results obtained from a paint film fungicide experiment.

The test chemical (Compound No. 1 of Table I was incorporated into a 100 gram quantity of DULUX emulsion paint to provide final concentrations in the wet paint of 1000, 2000 and 3000 ppm active ingredient. (The word DULUX is a Trade Mark).

Paint containing the test chemical was applied to one side of a filter paper and a second coat of paint was applied to the same side after a 24 hour drying period. The painted filter paper was transferred into a Petri dish containing malt agar (painted side uppermost) and the filter paper and surrounding zone of malt agar was sprayed with a suspension of either *Pullularia pullulans* or *Alternaria tenuis*. The inoculated Petri dishes were incubated for 5 days at 25°C and examined for fungal growth. A chemical treatment was considered to be effective if it prevented the formation of confluent fungal growth on the paint film.

lial growth and 3 being complete inhibition. The compound scored gradings as shown in Table VIII below.

| Disease | Code Letter | Disease | Code Letter |
| --- | --- | --- | --- |
| *Pythium ultimum* | A | *Septoria nodorum* | H |
| *Phytophthora palmivora* | B | *Ascochyta pisi* | I |
| *Phytophthora cactorum* | C | *Rhizoctonia solani* | J |
| *Fusarium culmorum* | D | *Sclerotium rolfsii* | K |
| *Fusarium nivale* | E | *Helminthosporium victoriae* | L |
| *Gibberella zeae* | F | | |
| *Helminthosporium sativum* | G | | |

TABLE VIII

| Compound No. (Table I above) | Disease Code Letter | | | | | | | | | | | |
| --- | --- | --- | --- | --- | --- | --- | --- | --- | --- | --- | --- | --- |
| | A | B | C | D | E | F | G | H | I | J | K | L |
| 1 | 3 | 3 | 3 | 3 | 3 | 3 | — | 3 | 3 | 3 | — | 3 |
| 2 | 3 | 3 | 3 | 3 | 3 | 3 | 3 | 3 | 3 | — | — | |
| 4 | 2 | — | 0 | 3 | 3 | 3 | 3 | 3 | 0 | 3 | 3 | — |
| 5 | 3 | 3 | — | 3 | 3 | 3 | 3 | 3 | 3 | 3 | 3 | — |
| 6 | 3 | 3 | 3 | 3 | 3 | 3 | 3 | 3 | 3 | 3 | 3 | — |

"—" means no test was carried out

The 100 gram quantities of paints containing chemical treatments which were found to be effective in the above mentioned experiment were maintained at 50°C for 2 weeks in an oven as an accelerated storage test.

After storage the paints were applied to filter paper and again tested in the above-mentioned manner. Treated paints which were still active were again applied to filter papers and subjected to a weathering treatment consisting of a 24 hour leaching period followed by a 24 hour heat treatment in an oven at 65°C. The antifungal activity of the weathered paint films was then determined.

The compound No. 1 of Table I was found to retain its activity after the storage and weathering treatments being active at 1000 ppm against *Pullularia pullulans* and *Alternaria tenuis*.

EXAMPLE 30

The compounds of the invention were also tested in vitro against the fungal diseases listed below. For this test the chemical is incorporated into potato dextrose agar, usually at 100 ppm. A disc of agar, infected with the growing mycelium of the test fungus, is placed on the surface of the chemically treated agar and the plates are incubated for approximately 5 days. Activity is scored on a scale 0–3, 0 being no inhibition of myce-

EXAMPLE 31

This example illustrates the activity of the invention compounds and compositions as soil fungicides.

Naturally infected seed was dressed with chemical compound No. 4 of Table I and with a "mercury" type compound and then sown in pots. The percentage number of plants which emerged from the seeds and the percentage number of healthy plants was assessed four to five weeks after the seeds were planted.

The results are expressed in Table IX below.

TABLE IX

| Compound | Rate (ppm) | *Fusarium nivale* | | *Septoria nodorum* | Disease *Helminthosporium Avenae* | | *Helminthorporium victoriae* | |
| --- | --- | --- | --- | --- | --- | --- | --- | --- |
| | | E | H | E | E | H | E | H |
| Compound No. 4 of Table I | 500 | 77 | 73 | 61 | 83 | 73 | 97 | 95 |
| "Mercury" type Compound | 25 | 74 | 67 | 59 | 79 | 59 | 66 | 47 |
| Control | | 73 | 32 | 45 | 75 | 45 | 48 | 30 |

E = Percentage Number which emerged
H = Percentage number of healthy plants

The superiority of the invention compound is clearly apparent over a "mercury" type compound. As is well known the latter type of compound has disadvantages in the environment.

EXAMPLE 32

This example illustrates the activity of compound No. 4 of Table I against the disease *Tilletia caries* (bunt of wheat).

Capelle wheat seed was artificially inoculated with 0.5% bunt spores (based on the weight of seed) then dressed with the chemical under test and sown in six replicate rows (200 seeds per row) in soil in the open air.

The number of diseased ears was assessed 9 months later and expressed in Table X below as a percentage of the total.

TABLE X

| Compound No. | Rate of Application (p.p.m.) | Percentage Number of Diseased Ears |
|---|---|---|
| No. 4 of Table I | 500 | 2 |
| Control | — | 37.2 |

We claim:

1. A pesticidal composition having anti-fungal and anti-bacterial properties comprising, as the active ingredient, a fungicidally or bactericidally effective amount of a quinoxaline derivative of the formula:

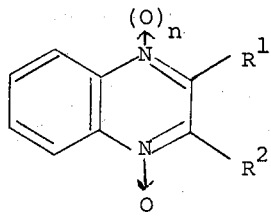

wherein $R^1$ is hydrogen, chlorine or bromine; $R^2$ is chlorine, bromine or iodine; and $n$ is 0 or 1; together with a major amount of a carrier for the active ingredient, the carrier being a solid diluent, or a liquid diluent containing a surface active agent.

2. A composition having anti-fungal properties comprising, as the active ingredient, a fungicidally or bactericidally effective amount of the compound having the structure:

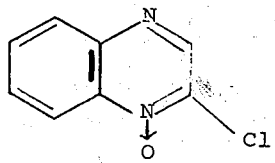

or the compound having the structure:

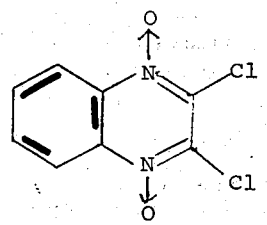

together with a major amount of a carrier therefor, the carrier being a solid diluent, or a liquid diluent containing a surface active agent.

3. A composition according to claim 1 wherein the active ingredient is a compound having the formula:

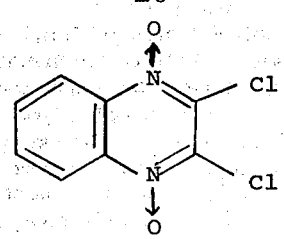

4. A method of combatting fungi and bacteria which comprises treating plants, seeds, harvested fruits or vegetables subject to infestation with, fungi and bacteria, with a fungicidally or bactericidally effective amount of a quinoxaline derivative of the formula

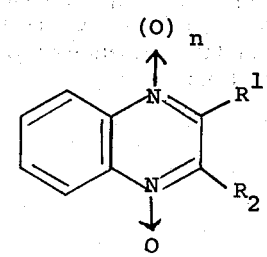

wherein $R^1$ is hydrogen, chlorine or bromine; $R^2$ is chlorine, bromine or iodine; and $n$ is 0 or 1.

5. A method according to claim 4 wherein the active ingredient is a compound having the formula:

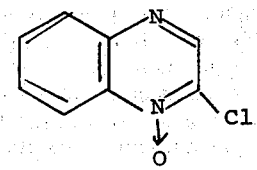

or the compound having the formula:

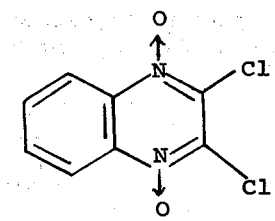

6. A method according to claim 4 wherein the active ingredient is the compound having the formula:

7. A method according to claim 4 wherein the active ingredient is the compound having the formula:

* * * * *